United States Patent [19]

Fukushima et al.

[11] Patent Number: 4,789,911
[45] Date of Patent: Dec. 6, 1988

[54] INFORMATION RECORDING AND REPRODUCING APPARATUS

[75] Inventors: Yoshihisa Fukushima, Osaka; Isao Satoh, Neyagawa; Makoto Ichinose, Sakai; Yuzuru Kuroki, Toyonaka; Yuuji Takagi, Neyagawa, all of Japan

[73] Assignee: Matsushita Electric Industrial Co., Ltd., Osaka, Japan

[21] Appl. No.: 49,306

[22] Filed: May 13, 1987

[30] Foreign Application Priority Data

May 16, 1986 [JP] Japan .................. 61-112906

[51] Int. Cl.⁴ .................. G11B 5/55; G11B 20/18
[52] U.S. Cl. .................. 360/72.2
[58] Field of Search .................. 360/72.2

[56] References Cited

FOREIGN PATENT DOCUMENTS 59-154654 9/1984 Japan .

Primary Examiner—Robert S. Tupper
Attorney, Agent, or Firm—Stevens, Davis, Miller & Mosher

[57] ABSTRACT

In an information and recording and reproducing apparatus using a disc-shaped information recording medium having a plurality of recording tracks, each of which recording tracks is divided into a plurality of sectors, to record and reproduce information on and from the information recording medium on a sector-by-sector basis, when a target sector is detected to be a defective sector whose address can not be reproduced, in the first place, a reference sector, which is positioned preceding the defective target sector and whose address can be reproduced, is detected. Then, a rotational latency time from the detected reference sector to the defective target sector is measured by using:

- a time measuring circuit for measuring the rotational latency time per se; or
- a counter circuit for counting the number of a sector mark or sector marks which indicate the presence of an associated sector or sectors and which are detected during the rotational latency time, so that the defective target sector may be taken to be a normally detected target sector whereby information may be recorded and reproduced on and from the defective target sector, thereby making it possible to perform recording and reproduction of information on and from a defective sector whose address can not be reproduced.

7 Claims, 4 Drawing Sheets

INFORMATION RECORDING AND REPRODUCING APPARATUS

BACKGROUND OF THE INVENTION

1. Field of the Invention

The present invention relates to an information recording and reproducing apparatus, and more particularly relates to an information recording and reproducing apparatus in which recording and reproduction of information are performed on and from a disc-shaped information recording medium having a plurality of recording tracks, each of which recording tracks is divided into a plurality of sectors, and the information recording and reproduction are effected on a sector-by-sector basis.

2. Description of the Related Art

When performing recording and reproduction of information on and from a disc-shaped information recording medium on a sector-by-sector basis, sometimes there is encountered a defective sector whose address can not be reproduced due to a defect existing in the information recording medium, etc. A method of recording and reproducing information on and from such a defective sector in a conventional information recording and reproducing apparatus is disclosed, for example, in Japanese Patent Unexamined Publication No. 59-154654. That is, when it is impossible to reproduce a track address of a target sector, on and from which information is to be recorded and reproduced, but it is possible to identify only a sector address of the target sector by the coincidence detection, by utilizing the result of detection of the respective track addresses of n sectors positioned preceding the target sector, it is possible to identify the track address of the defective target sector and thereby to perform recording and reproduction of information on and from the defective target sector, even when its track address can not be reproduced.

In such a conventional method, however, it is impossible to perform information recording and reproducing on and from a target sector, when not only a track address but also a sector address of the target sector can not be reproduced.

SUMMARY OF THE INVENTION

It is therefore an object of the present invention to eliminate the disadvantage of the prior art.

Thus, it is an object of the present invention to provide an information recording and reproducing apparatus in which information recording and reproducing can be achieved on and from a target sector even when not only a track address but also a sector address of the target sector can not be reproduced.

In order to attain the above object, the present invention proposes an information recording and reproducing apparatus which comprises: means for detecting a sector, whose address can not be reproduced, as a defective sector; means for detecting a sector, whose sector identifier (ID) field contains no defect and which is positioned preceding a target sector on and from which information is to be recorded and reproduced, as a reference sector; and means for measuring a rotational latency time from the reference sector to the target sector. In the information recording and reproducing apparatus of the present invention, when a target sector, on and from which information is recorded and reproduced, is detected to be a defective sector whose address can not be reproduced, in the first place, a reference sector, which is positioned preceding the target sector and whose address can be reproduced, is detected. Then, a rotational latency time from the reference sector to the target sector is measured by using a time measuring circuit or by using a counter circuit for counting the number of sector marks which are detected from respective sectors, whereby information is recorded and reproduced on and from the defective target sector whose address can not be reproduced.

The above and other objects and features of this invention will become more apparent from the description of the embodiments of this invention given hereinafter in conjunction with the accompanying drawings.

DESCRIPTION OF PREFERRED EMBODIMENTS

Figure 1:
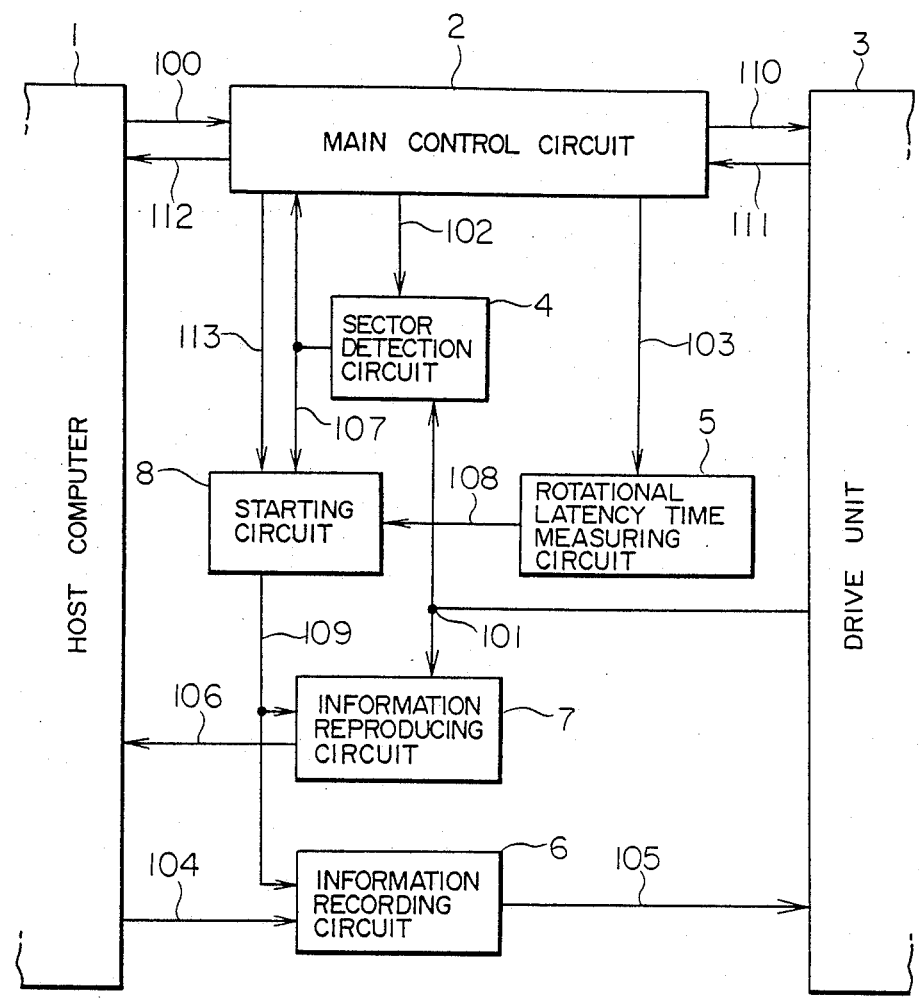
FIG. 1 is a block diagram showing the structure of the information recording and reproducing apparatus of an embodiment of the present invention.

Referring to the drawings, the embodiments of the present invention will be described hereinafter in more detail. FIG. 1 is a block diagram showing the information recording and reproducing apparatus of an embodiment of the present invention. In FIG. 1, the information recording and reproducing apparatus of this embodiment includes a main control circuit 2 for controlling the whole information recording and reproducing apparatus in accordance with a device command signal 100 sent from a host computer 1, a sector detection circuit 4 for detecting address information, which is coincident with a retrieval sector address signal 102 set by the main control circuit 2, in a reproduced signal 101 sent from a drive unit 3 and outputting a detection signal 107, a rotational latency time measuring circuit 5 for measuring a rotational latency time from a reference sector to a target sector on the basis of measurement data 103 sent from the main control circuit 2, an information recording circuit 6 for modulating recording information 104 supplied from the host computer 1 and supplying a recording signal 105 produced by the modulation to the drive unit 3, an information reproducing circuit 7 for demodulating data contained in the reproduced signal 101 sent from the drive unit 3 and supplying reproduced information 106 obtained by the demodulation to the host computer 1, a starting circuit 8 for supplying a start signal 109 to the information recording circuit 6 or the information reproducing circuit 7 in accordance with the detection signal 107 supplied from the sector detection circuit 4 or a substitutional detection signal 108 supplied from the rotational latency time measuring circuit 5, respectively.

Figure 2:
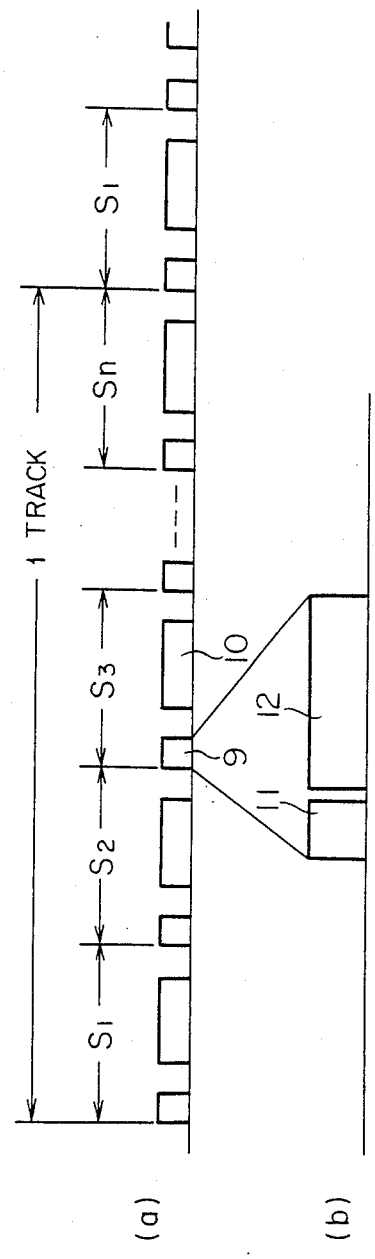
FIG. 2 is an explanatory diagram for explaining the structure of one track.

FIG. 2 shows the structure of each track in an information recording medium used in this embodiment. As shown in FIG. 2(a), each track is equally divided into n sectors ranging from a sector $S_1$ to a sector $S_n$, and each sector is composed of a sector identifier (ID) field 9 and a data field 10. Further, as shown in FIG. 2(b), the sector ID field 9 is composed of a sector mark 11, which shows the beginning end of a sector in common with all the sectors, and an address portion 12 containing address information which includes a track address and a sector address and which is peculiar to each sector.

Figure 3:
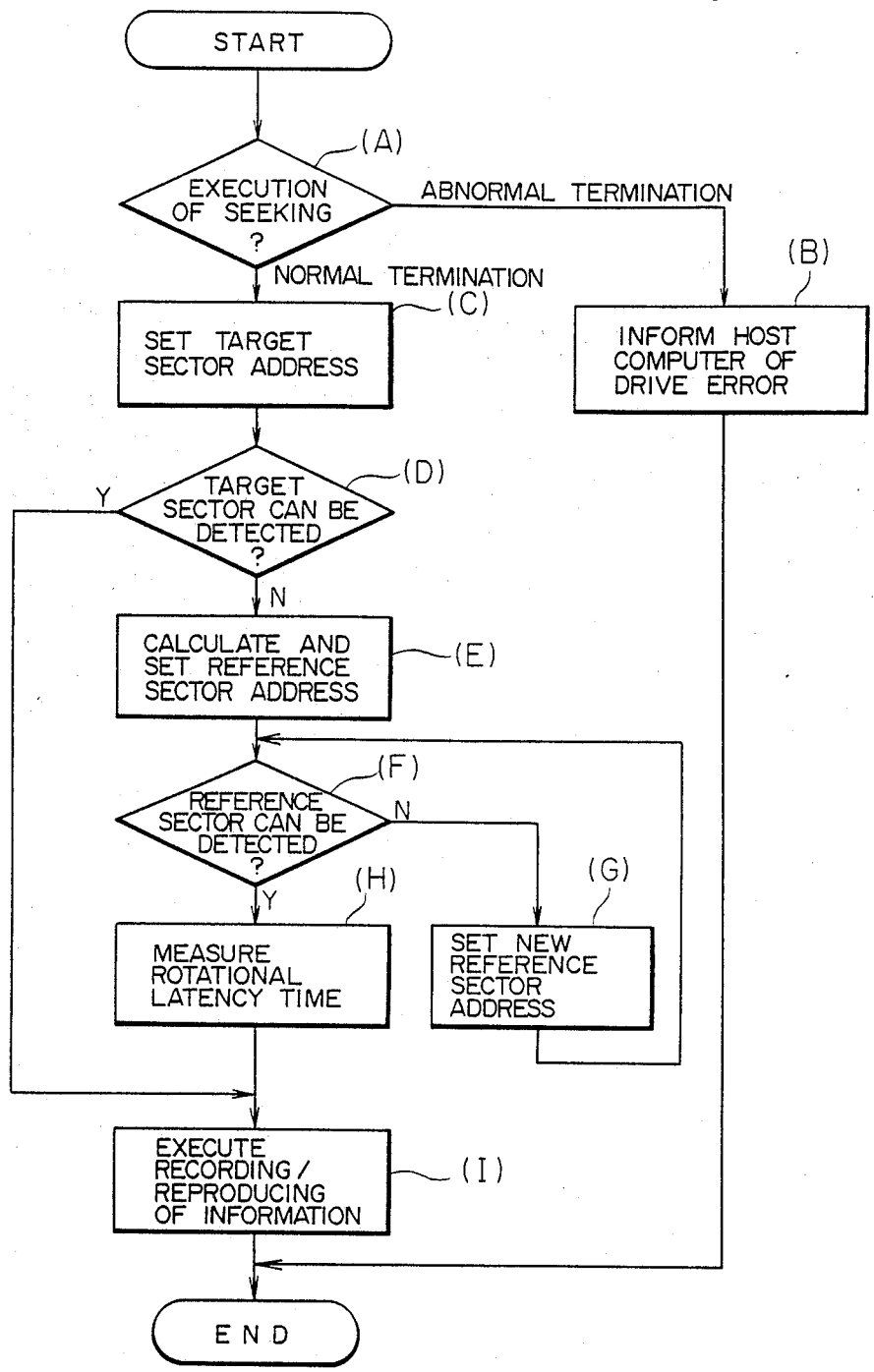
FIG. 3 is a flowchart for explaining the operations of recording and reproducing information on and from a defective sector.

In accordance with the flowchart shown in FIG. 3, the operation of the information recording and reproducing apparatus of the embodiment of the present invention having the above-described structure will be explained hereunder.

(A) Upon reception of the device command signal 100 from the host computer 1, the main control circuit 2 performs interpretation of the device command signal 100 and outputs a drive command signal 110 for instructing the drive unit 3 to execute a seek operation for seeing a track which contains a target sector.

(B) When the drive unit 3 detects abnormality during the execution of the seek operation, the main control circuit 2 receives a drive status signal 111, which is outputted from the drive unit 3 and indicates abnormal termination of the seek operation, and sends sense information 112 to the host computer 1 to thereby terminatinate the execution of the command.

(C) When the seek operation is normally terminated, the drive unit 3 confirms an associated track address and sends a drive status signal 111, which indicates normal termination of the seek operation, to the main control circuit 2. In order to detect a target sector on and from which information is to be recorded and reproduced, the main control circuit 2 sets a target sector address as a retrieval sector address signal 102 and sends the retrieval sector address signal 102 and an enable signal 113 to the sector detection circuit 4 and to the starting circuit 8, respectively.

(D) The sector detection circuit 4 detects address information contained in a reproduced signal 101 sent from the drive unit 3 and performs coincidence detection between the detected address information and the retrieval sector address signal 102. If the target sector is detected by the coincidence between the detected address information and the retrieval sector address signal 102, the sector detection circuit 4 sends a detection signal 107 to the starting circuit 8.

(E) If the target sector is not detected within a maximum rotational latency time, the main control circuit 2 stops sending the enable signal 113 to the starting circuit 8, takes a sector positioned immediately before the target sector on the disk as a reference sector, sets the address of the reference sector as a new retrieval sector address signal 102, and sends the new retrieval sector address signal 102 to the sector detection circuit 4.

(F) The sector detection circuit 4 detects address information contained in the reproduced signal 101 sent from the drive unit 3, and performs coincidence detection between the detected address information and the new retireval sector address signal 102.

(G) If the reference sector is not detected within the maximum rotational latency time, the main control circuit 2 takes a sector positioned immediately before the current reference sector on the disk as a new reference sector, sets the address of the new reference sector as a further new retrieval sector address signal 102, and sends the further new retrieval sector address signal 102 to the sector detection circuit 4.

(H) If the sector detection circuit 4 detects the reference sector, it sends a detection signal 107 to the main control circuit 2. The main control circuit 2 sends an enable signal 113 to the starting circuit 8, and at the same time it sends measurement data 103, which correspond to a rotational latency time from the detected reference sector to the target sector, to the rotational latency time measuring circuit 5 and causes the circuit 5 to start its operation. Upon, completion of the measurement of the rotational latency time given by the measurement data 103, the rotational latency time measuring circuit 5 takes the target sector to have been detected and sends a substitutional detection signal 108 to the starting circuit 8 in place of a detection signal 107.

(I) Upon reception of the detection signal 107 sent from the sector detection circuit 4 in the operation of the above paragraph (D), or the substitutional detection signal 108 sent from the rotational latency time measuring circuit 5 in the operation of the above paragraph (H), the starting circuit 8 outputs a start signal 109 which is sent to the information recording circuit 6 or the information reproducing circuit 7 in accordance with the content of the enable signal 113 sent from the main control circuit 2. In an information recording operation, the information recording circuit 6 modulates recording information 104 sent from the host computer 1 and sends a thus produced recording signal 105 to the drive unit 3 to be recorded on the disk therein, thereby completing the execution of a device command 100. While, in an information reproducing operation, the information reproducing circuit 7 detects and demodulates data contained in the reproduced signal 101 sent from the drive unit 3 and sends reproduced information 106 thus produced to the host computer 1, thereby completing the execution of a device command 100.

Next, with respect to the operation of the rotational latency time measurement performed by the rotational latency time measuring circuit 5 in this embodiment, two methods therefor will be described with reference to the block diagrams of FIGS. 4A and 4B and the signal waveform diagram of FIG. 5. FIG. 5(a) shows the reproduced signal 101 outputted from the drive unit 3 within a time period from a reference sector $S_{n\text{-}k}$, which precedes a target sector $S_n$ by k sectors, to the target sector $S_n$. In FIG. 5(a), symbols ID and DF represent a secot ID field 9 and a data field 10 which are comprised in each sector, respectively. FIG. 5(b) shows the detection signal 107 outputted from the sector detection circuit 4. In FIG. 5(b), reference numeral 116 designates a detection signal detected from the reference sector $S_{n\text{-}k}$, and reference numeral 117 indicates the timing of a detection signal to be detected from the target sector $S_n$, if the target sector $S_n$ is not a defective sector. FIG. 5(c) shows sector marks 11 ($SM_1$, $SM_2$, . . ., $SM_{k\text{-}1}$, $SM_k$) which are detected by being discriminated from the reproduced signal 101 at the beginning end portions of the sector ID fields 9 of the respective sectors ranging from the sector $S_{n\text{-}k+1}$, which follows the reference sector $S_{n\text{-}k}$, to the target sector $S_n$.

Figure 4A:
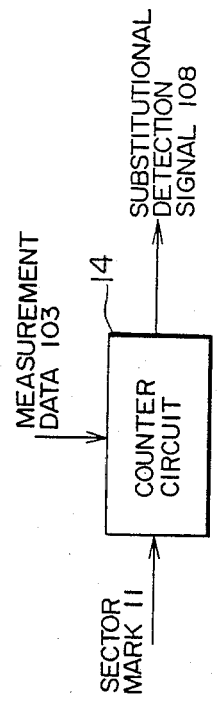
FIGS. 4A and 4B are block diagrams each thereof showing an example of the rotational latency time measuring circuit 5.
Figure 5:
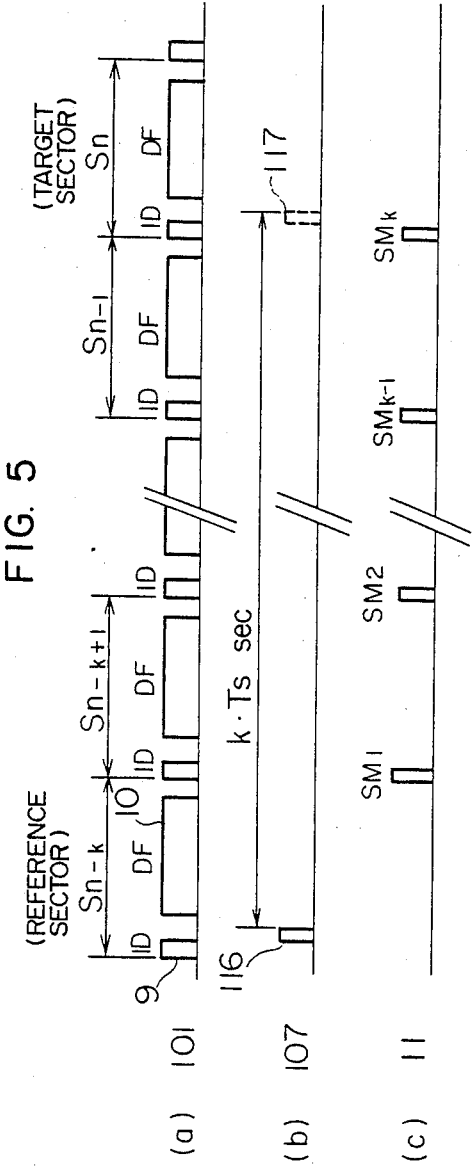
FIG. 5 is a waveform diagram showing the waveforms of signals appearing at various portions of the rotational latency time measuring circuit 5 when it is in operation.

A first one of the two methods is to measure the rotational latency time by using a time measuring circuit 13 as shown in FIG. 4A. In this method, the measurement data 103 outputted from the main control circuit 2 is a rotational latency time per se from the reference sector to the target sector. For example, as shown in FIG. 5(a), when the reference sector $S_{n-k}$ is detected k sectors preceding the target sector $S_n$, the measurement data 103 are given by $k \cdot T_s$ sec, where $T_s$ represents one sector time length in seconds. the operation of the rotational latency time measurement is started by a process such that the sector detection circuit 4 sends the detection signal 116 shown in FIG. 5(b) to the main control circuit 2 upon its detection of the reference sector $S_{n-k}$, and, in response thereto, the main control circuit 2 supplies the data of $k \cdot T_s$ sec to the time measuring circuit 13 shown in FIG. 4A as the measurement data 103. As the operation of the time measuring circuit 13 is started by the application of the measurement data 103 thereto, the time measuring circuit 13 measures the time indicated by the measurement data 103 by using a clock signal 114 and generates a substitutional detection signal 108 in place of a detection signal 117 shown by a broken line in FIG. 5(b), upon completion of the time measuring operation thereof.

Figure 4B:
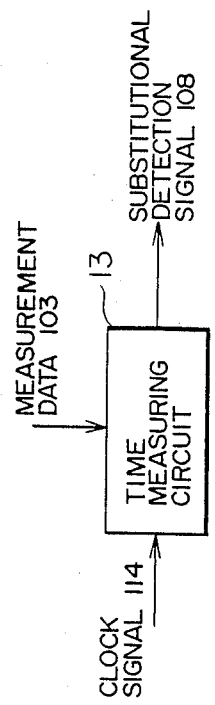

While, in a second method, the rotational latency time is measured by using a counter circuit 14 as shown in FIG. 4B. In this method, as a sector mark 11 shown in FIG. 5(c), which is format-recorded at the beginning end of each sector ID field 9 (as shown in FIG. 2(b)), is detected by being discriminated from the reproduced signal 101, the number of the sector marks 11 detected during the rotational latency time from the reference sector to the target sector is applied to the counter circuit 14 as the measurement data 103. For example, when the reference sector $S_{n-k}$ is detected k sectors preceding the target sector $S_n$, as shown in FIG. 5(a), the total number k of the sector marks $SM_i$ (i=1 to k) detected in the sector ID fields 9 of the respective sectors ranging) from the sector $S_{n-k+1}$ to the target sector $S_n$, as shown in FIG. 5(c), is applied to the counter circuit 14 as the measurement data 103. As the operation of the counter circuit 14 is started by the application thereto of the data k as the measurement data 103, the counter circuit 14 counts k sector marks 11 and generates a substitutional detection signal 108 in place of a detection signal 117 shown by a broken line in FIG. 5(b), upon completion of the counting operation thereof, only with a time delay corresponding to the rotational latency time for an address portion 12 of a sector ID field 9 shown in FIG. 2(b).

Further, the main control circuit 2 in this embodiment may be realized by using a general purpose microprocessor. The microprocessor may include the above-mentioned time measuring circuit or counter circuit. Alternatively, it is possible to realize the function of the rotational latency time measuring circuit 5 in the microprocessor by counting the sector marks 11 shown in FIG. 5(c) by using software in the microprocessor.

As described above, in the information recording and reproduced apparatus according to the present invention, when a target sector, on and from which information is to be recorded and reproduced, is detected to be a defective sector whose address can not be reproduced, in the first place, a sector, which is positioned preceding the defective target sector and whose address can be reproduced, is detected as a reference sector. Then, by measuring the rotational latency time from the detected reference sector to the defective target sector by using a time measuring circuit or a counter circuit for counting the number of sector marks 11 detected in the respective sectors, it is possible to effect recording and reproduction of information on and from the defective target sector, taking as if the target sector can be detected. Accordingly, with the information recording and reproducing apparatus according to the present invention, it is possible to record and reproduce information on and from a sector even when the sector is defective. Thus, the information recording and reproducing apparatus of the present information has a remarkable advantage in practical use.

We claim:

1. An information recording and reproducing apparatus using a disc shaped information recording medium having a plurality of recording tracks, each of which recording tracks is divided into a plurality of sectors, each of said sectors being composed of a sector ID field containing address information and a data field in which data are recorded, so that information is recorded and reproduced on and from said sectors, said apparatus comprising:

means for detecting a sector, whose address can not be reproduced, to be a defective sector;

means for detecting a sector, whose address can be reproduced and which is positioned preceding a target sector on and from which information is to be recorded and reproduced, to be a reference sector; and means for measuring a rotational latency time from said detected reference sector to said target sector, whereby, when a target sector is detected to be a defective sector, a reference sector is detected in the first place and then a rotational latency time from said detected reference sector to said defective target sector is measured, thereby effecting recording and reproduction of information on and from said defective target sector.

2. An information recording and reproducing apparatus according to claim 1, in which the rotational latency time is measured by using a time measuring circuit.

3. An information recording and reproducing apparatus according to claim 2, in which said time measuring circuit for measuring the rotational latency time is incorporated in a microprocessor.

4. An information recording and reproducing apparatus according to claim 1, in which said sector ID field includes a sector mark for indicating the presence of said associated sector ID field so that, as said sector mark is detected during the rotational latency time, the rotational latency time is measured by using a counter circuit for counting the number of said detected sector mark or sector marks.

5. An information recording and reproducing apparatus according to claim 4, in which said counter circuit for measuring the rotational latency time is incorporated in a microprocessor.

6. An information recording and reproducing apparatus according to claim 1, in which only a sector, whose address can be reproduced and which is positioned one or two sectors preceding a target sector on said disc-shaped information recording medium, is detected to be a reference sector.

7. An information recording and reproducing apparatus according to claim 1, in which, only when a target sector is detected to be a defective sector at the time of reproducing information, a reference sector is detected and then the rotational latency time from said detected reference sector to said defective target sector is measured, thereby reproducing information from said defective target sector.

* * * * *